United States Patent [19]

Chen et al.

[11] Patent Number: 5,600,072
[45] Date of Patent: Feb. 4, 1997

[54] CAPACITIVE PRESSURE SENSOR AND METHOD FOR MAKING THE SAME

[75] Inventors: Shiuh-Hui S. Chen, Lake Zurich; Carl Ross, Mundelein, both of Ill.

[73] Assignee: Motorola, Inc., Schaumburg, Ill.

[21] Appl. No.: 494,127

[22] Filed: Jun. 23, 1995

[51] Int. Cl.⁶ .................................................. G01L 9/12
[52] U.S. Cl. .................................................. 73/724
[58] Field of Search .......................... 73/718, 724, 754; 361/25.41, 283.3

[56] References Cited

U.S. PATENT DOCUMENTS

| | | | |
|---|---|---|---|
| 4,158,311 | 6/1979 | Yasuhara et al. | 73/718 |
| 4,405,970 | 9/1983 | Swindal et al. | 73/724 |
| 4,432,007 | 2/1984 | Cady | 73/718 |
| 4,773,972 | 9/1988 | Mikkor | 73/724 |
| 4,838,088 | 6/1989 | Murakami | 73/724 |
| 4,864,463 | 9/1989 | Shkedi et al. | 361/283.3 |
| 5,001,595 | 3/1991 | Dittrich et al. | 73/718 |
| 5,186,054 | 2/1993 | Sekimura | 73/724 |
| 5,258,650 | 11/1993 | Polak et al. | 257/788 |
| 5,323,656 | 6/1994 | Fung et al. | 73/718 |

*Primary Examiner*—Richard Chilcot
*Assistant Examiner*—William L. Oen
*Attorney, Agent, or Firm*—Michael L. Smith

[57] ABSTRACT

A sensor (44) having all electrical connection formed on one of the sensor's sides. A first substrate (10) operably attached to a second substrate (32) where the second substrate includes at least one feedthrough hole (22). A first electrical connection (36) is formed on the first substrate (10) through the feedthrough hole (22). A second electrical connection (38) is formed on the second substrate (32) such that the first and second electrical connections (36, 38) are formed on the same side of the sensor (44). An electrical insulator (26) is disposed between the second substrate (32) and the first electrical connection (36) to electrically isolate the first electrical connection (36) from the second substrate (32).

10 Claims, 2 Drawing Sheets

CAPACITIVE PRESSURE SENSOR AND METHOD FOR MAKING THE SAME

FIELD OF THE INVENTION

This invention is generally directed to the field of capacitive pressure sensors, and specifically to media isolated capacitive pressure sensors.

BACKGROUND OF THE INVENTION

There are more and more environments in which it is desirable or necessary to sense data, such as pressure. For example, in automotive applications, it is necessary to sense the pressure of such media as gasoline or transmission oil. Obviously, a sensor must be exposed to these harsh media to produce accurate pressure data.

Contemporary pressure sensors require special protection of the electrical connections on the sensor. Typically, attempts at such protection are made by depositing a gel over the portion of the sensor exposed to the harsh media, thereby sealing the vulnerable electrical connections from the harsh media. If the sensor electrodes were left exposed to the media the electrical connections would soon fail due to the corrosive nature of the media. Depositing the gel on the sensor is ineffective in protecting the electrical connections and, in addition, it is a relatively expensive procedure.

A typical prior art capacitive sensor requires at least some electrical connections to be exposed to the media because of the construction of the sensor. Prior art sensors have a first capacitive electrode that is electrically isolated from a second capacitive electrode such that a sealed cavity is formed between the two electrodes. Thus, a capacitor is formed. The electrode of a prior art sensor that is in contact with the media requires protection from the media such as expensive approach commonly referred to as "oil fill".

What is needed is an improved capacitive pressure sensor that is low-cost and effectively isolates the sensor's electrical connections from the harsh media to which the sensor may be exposed.

DETAILED DESCRIPTION OF A PREFERRED EMBODIMENT

Figure 1:
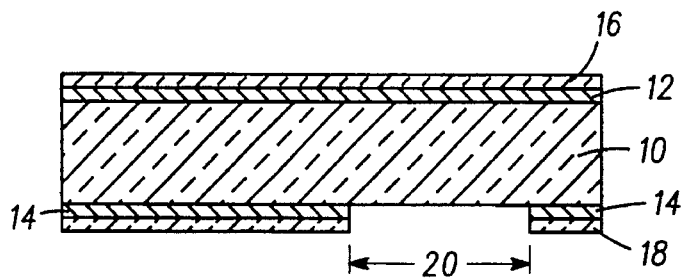
FIGS. 1-9 are cross-sectional views of various method steps for fabricating a capacitive pressure sensor in accordance with the present invention.

FIGS. 1-10 disclose a sensor in accordance with the present invention at various stages of manufacture. FIG. 1 shows a substrate 10 having dielectrics such as oxide layers 12 and 14, which are preferably thermally grown thereon with a nitride layers 16 and 18 deposited on top of the oxide layers 12 and 14. Preferably, the layers 12, 14, 16, and 18 are at least a few hundred angstroms thick in order to provide effective isolation of the substrates.

Figure 2:
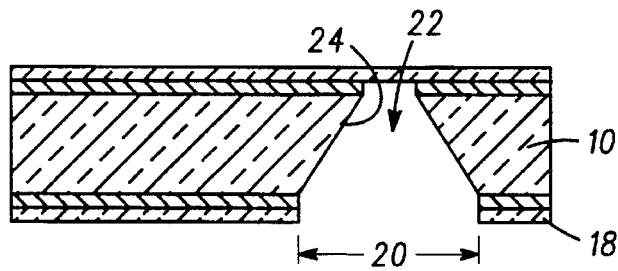

As can be seen, bottom layers 14 and 18 are preferably patterned such that a void 20 is formed in the layers 14 and 18. The void 20 is a place at which a feedthrough hole will be formed in order to allow the electrical connection to the sensor to be isolated from the media to be sensed. The feedthrough hole 22 is formed by any well known method such as chemical etching and is shown in FIG. 2.

As those skilled in the art will appreciate, the oxide layer 14 and nitride layer 18 are preferably silicon oxide and silicon nitride respectively, and are used as an etch mask during the bottom side etch to form side wall 24 of feedthrough hole 22. Anisotropically etching feedthrough hole 22 produces an angle of approximately 55 degrees.

Figure 3:
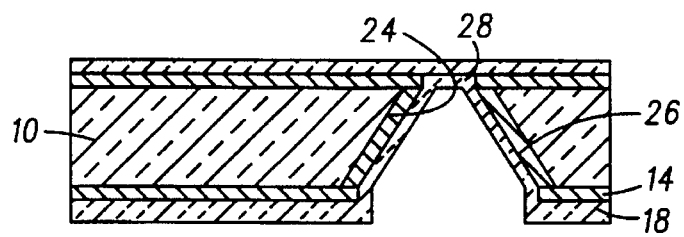

Next, as seen in FIG. 3 an electrical insulator 26 such as an oxide layer is deposited on side wall 24 to minimize parasitic capacitance that will otherwise exist between substrate 10 and an electrical contact to be formed in feedthrough hole 22. Another layer of nitride 28 is then deposited on top of the oxide layer 26.

Figure 4:
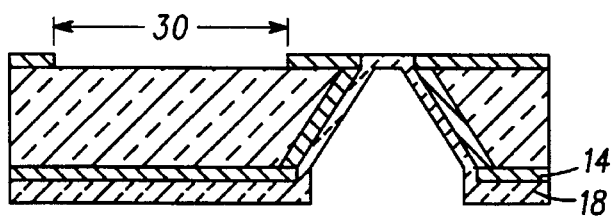
Figure 5:
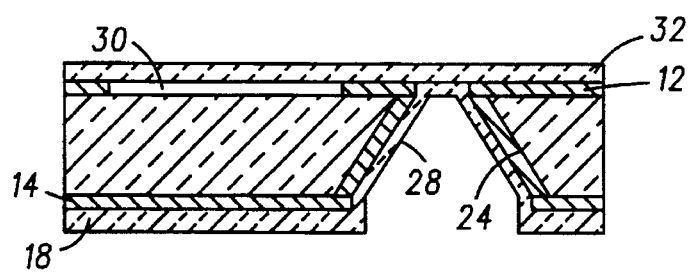

The top nitride layer 16 is then stripped away and portions of the oxide layer 12 are selectively removed to form a cavity 30 as shown in FIG. 4. The next step is to attach a second substrate or diaphragm 32 to the oxide layer 12 thereby hermetically sealing cavity 30. As those skilled in the art will appreciate, diaphragm 32 is thinned to a desirable thickness such as by chemical or mechanical means. The resulting diaphragm 32 is preferably thin enough to deflect when exposed to the pressure of the media to be sensed but thick enough to be durable.

Figure 6:
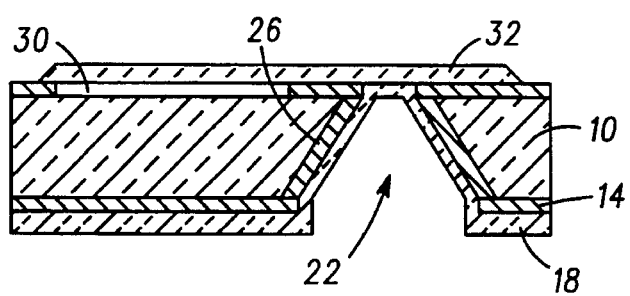
Figure 7:
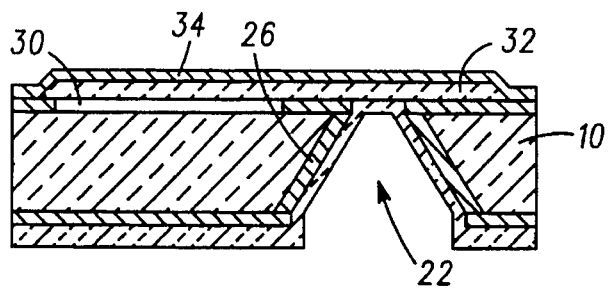
Figure 8:
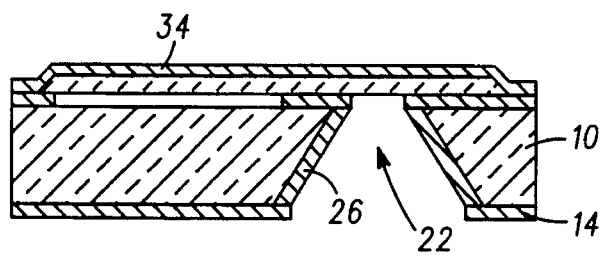
Figure 9:
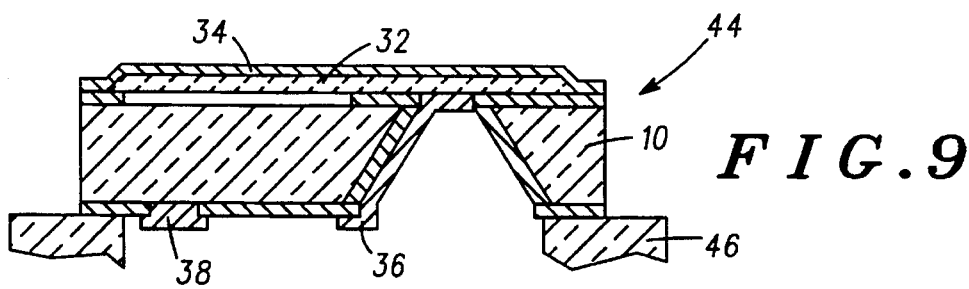

Preferably, the diaphragm 32 is grooved etched about its perimeter as shown in FIG. 6 and a passivation layer 34 deposited on top of substrate 32. The groove etch of diaphragm 32 allows the passivation layer 34 to electrically isolate diaphragm 32 from substrate 10 and to reduce leakage current between the diaphragm 32 and 10. Furthermore, the groove etch allows for more accurate control of the parasitic capacitance. Preferably, plasma silicon nitride is used for passivation layer 34 because it can withstand harsh environments such as nitric and sulfuric acids. The next step is to strip the bottom nitride layers 18 and 28 as shown in FIG. 8. Next, electrical connections or contacts 36 and 38 are formed onto the nearly completed sensor as shown in FIG. 9. As those skilled in the art world will appreciate, electrical contacts 36 and 38 may be formed onto substrates 32 and 10 in various ways other than that shown in FIG. 9 but should be formed on the same side of the sensor to allow the electrical contacts to be isolated from the media to be sensed.

Figure 10:
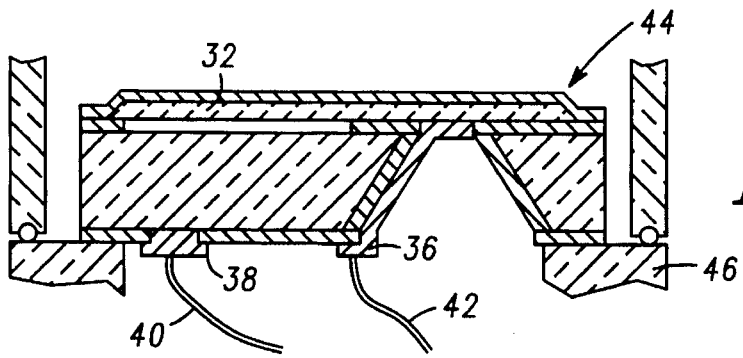
FIG. 10 is a cross-sectional view showing a capacitive pressure sensor in accordance with the present invention.

Finally, as shown in FIG. 10, electrical wires 40 and 42 are attached to electrical contacts 36 and 38. The completed sensor 44 is then bonded to a substrate 46 such that the electrical contacts 36 and 38 are sealed from the harsh media to which the sensor 44 may be exposed.

Figure 11:
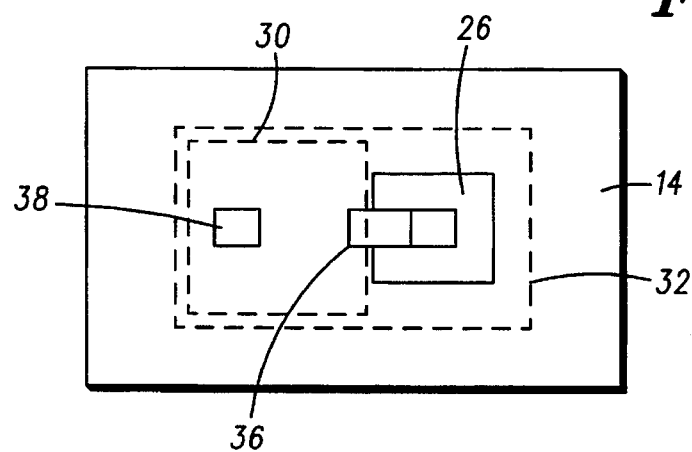
FIG. 11 is a bottom view of the capacitive pressure sensor of FIG. 9.

FIG. 11 is a bottom view of the sensor of FIG. 9 without substrate 46. This discloses one type of scheme to isolate the electrical contacts 36 and 38 allowing the electrical contacts to be isolated from harsh media. As those skilled in the art will appreciate there are other methods of attachment such as forming electrical contact 38 only on diaphragm 32, and not along the oxide layer 26 as shown in the preferred embodiment.

The sensor 44 includes diaphragm 32 and substrate 10 that each present a particular cross sectional area. As those skilled in the art will appreciate the cross sectional area of diaphragm 32 may be adjusted relative to the cross sectional area of substrate 10 to control parasitic capacitance. In addition, the sensor 44 may be constructed in what is commonly known as touch mode (not shown) and may include a boss (also not shown) on diaphragm 32. Touch mode refers to a configuration where the diaphragm 32 contacts or touches substrate 10 at a central region of cavity 30. Touch mode allows for greater sensitivity in sensor 44 with respect to pressure.

Thus, there has been shown and described a specific embodiment of this invention, further modifications and improvement will occur to those skilled in the art. Such modifications can include forming the diaphragm 32 and substrate 10 from a material other than the preferred silicon or forming first and second electrical connections 36 and 38 in manners other than those shown. All modifications retaining the basic underlying principles disclosed and claimed in the present invention are within the scope of this invention.

What is claimed is:

1. A pressure sensor comprising:

a first substrate presenting a top and a bottom surface;

a second substrate presenting a top and a bottom surface and having structure defining a feedthrough hole therein;

a first dielectric layer disposed on at least a portion of one of the first substrate's bottom surface and the second substrate's top surface and wherein the second substrate's top surface is attached to the first substrate's bottom surface such that a hermetically sealed cavity is defined between the first and second substrates by the first dielectric layer such that the first substrate functions as a diaphragm;

a first electrical connection disposed on the first substrate's bottom surface through the feedthrough hole;

a second electrical connection disposed on the second substrate's bottom surface;

an electrical insulator disposed on a side wall of the feedthrough hole for electrically isolating the first electrical connection from the second substrate; and wherein the sensor defined herein allows the first and second electrical connections to be formed approximate the second substrate's bottom surface.

2. The sensor of claim 1 wherein the first substrate includes a passivation layer for reducing leakage current between the first and second substrates.

3. The sensor of claim 1 wherein the first and second substrates are formed of silicon.

4. The sensor of claim 1 wherein the first and second substrates present first and second cross sectional areas, respectively, and wherein the first cross sectional area is adjusted relative to the second cross sectional area for controlling parasitic capacitance.

5. The sensor of claim 1 wherein the first substrate further includes a boss.

6. The sensor of claim 1 wherein the sensor is constructed in touch mode.

7. The sensor of claim 1 wherein the dielectric layer is formed of silicon oxide.

8. The sensor of claim 1 further including a second dielectric layer disposed on the second substrate for electrically isolating the second substrate from the first substrate.

9. The sensor of claim 1 wherein the first electrical connection is formed essentially only on the first substrate.

10. The sensor of claim 1 wherein the first electrical connection is formed from the first substrate, along a side wall of the feedthrough hole, to the second substrate's bottom surface.

\* \* \* \* \*